DEVICE FOR SCANNING PERFORATED TAPES

Filed April 24, 1957 2 Sheets-Sheet 1

INVENTORS
ETIENNE ALIZON
AND CHARLES VAZQUEZ
BY Paul M. Craig, Jr.
ATTORNEY.

INVENTORS
ETIENNE ALIZON
AND CHARLES VAZQUEZ
BY Paul M. Craig, Jr.
ATTORNEY.

United States Patent Office 2,954,434

Patented Sept. 27, 1960

2,954,434

DEVICE FOR SCANNING PERFORATED TAPES

Etienne Alizon, Le Chesnay, and Charles Vazquez, Paris, France, assignors to Compagnie Industrielle des Telephones, Paris, France, a corporation of France Filed Apr. 24, 1957, Ser. No. 654,819

Claims priority, application France May 2, 1956

7 Claims. (Cl. 178—42)

Figure 1:
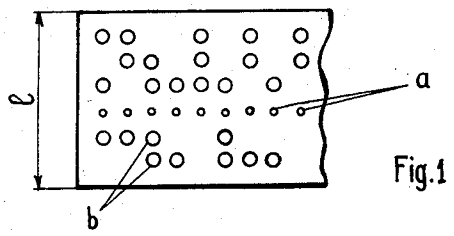

The present invention concerns improvements in devices for scanning perforated tapes, which can be used more especially in telecommunications for the transmission of telegraphic messages from previously perforated tapes. A device according to the invention may also be employed in certain accounting or statistical machines.

It is known that the international telegraphic code adopted for the transmission of arhythmic signals of teleprinters always necessitates seven pulses for transmitting a character, of which one start pulse is always negative and one stop pulse is always positive. The five pulses bounded by the start and stop pulses, i.e. the significant pulses, characterise the latter or the digit transmitted in accordance with the code. These are also the last pulses to be marked in the perforated tape, one positive pulse corresponding, for example, to one perforation and one negative pulse to an imperforate portion of the paper tape. The tape scanner performs the inverse operation, that is to say, it translates into five pulses of appropriate polarity, in the case of double-current evaluation, the five significant moments represented on the tape by imperforate portions or perforations. The tape scanner is frequently employed for the automatic transmission of the signals, for example either in manual exchanges in which the messages for one direction may be recorded on the same tape and are uninterruptedly transmitted one after the other, or in large concerns in which the employee in charge of the transmission receives the perforated tapes from the different departments and may even be unaware of the content of the messages transmitted. Various types of tape scanners are already known and employed in such cases in association with distributors.

However, in certain other cases of utilisation in which complete security of transmission is necessary, where a small shift of the transmission would render the reception unintelligible, it has been found essential to have more improved scanners, some features of which form the subject of the present invention.

This is the case in some secret coding methods in which each signal transmitted results from the combination of two component signals, i.e. a clear signal given by the teleprinter and a completely random signal given by the scanner of a tape composed of two random signals. It will be appreciated that if the same random signal is presented against the received signal at reception as at the emission it is readily possible to decode the signal into clear form. Moreover, it is necessary to ensure that no untimely shifting, even by one step, can occur, as this would render the reception unintelligible. Moreover, since the random tape comprises a succession of purely fortuitous signals, it bears at intervals certain phase adjustment references which, in association with the counting of the signals transmitted, indicate with precision the state of the transmission for bringing the component signals into coincidence.

An advantage of the invention is that it comprises a device for interrupting the transmission as soon as there occurs a shift caused, for example, by breaking or tearing of the perforated tape, by slipping or by a mechanical fault. Another advantage is that it shows at the instant of the stoppage the number of signals transmitted. A further advantage is a device for the destruction of the perforated tape after the transmission, which can be voluntarily set in operation. Another advantage is the provision of a button for re-setting the signal counter.

The scanning device according to the invention is characterised in that it comprises a driving wheel controlled through a ratchet wheel, a pawl and an electromagnet receiving a pulse every 140 milliseconds. The driving wheel actuates a driven wheel through the perforated tape and the driven wheel in turn transmits its movement to a wheel mounted loose on the same shaft as the driving wheel through gearings, such that the angular velocity of the driving wheel and its direction of rotation are the same as the angular velocity and the direction of rotation of the loose wheel. There is therefore no displacement of one wheel in relation to the other under normal conditions, but if for some reason the loose wheel stops turning the driving wheel continues to be actuated alone and thus makes a contact which interrupts the transmission.

In accordance with a further feature of the invention, the device comprises a counter mechanically controlled by the driven wheel and thus ceasing to be actuated as soon as a shift occurs as a result of, for example, breakage of the paper.

The device according to the invention comprises a knife actuated at each energisation of the controlling electromagnet and cutting the perforated tape in the longitudinal direction, but which can be so adjusted that it is not actuated if it is not desired that the tape should be destroyed.

An electric retarding device which, by reducing the suddenness of the forward step of the controlling electromagnet, permits a better advance of the perforated tape and avoids breakage thereof.

Further features and advantages of the invention will become apparent from the description hereinafter given with reference to the figures of the accompanying drawings, which show by way of example one constructional form of a scanning device according to the invention.

Figure 2:
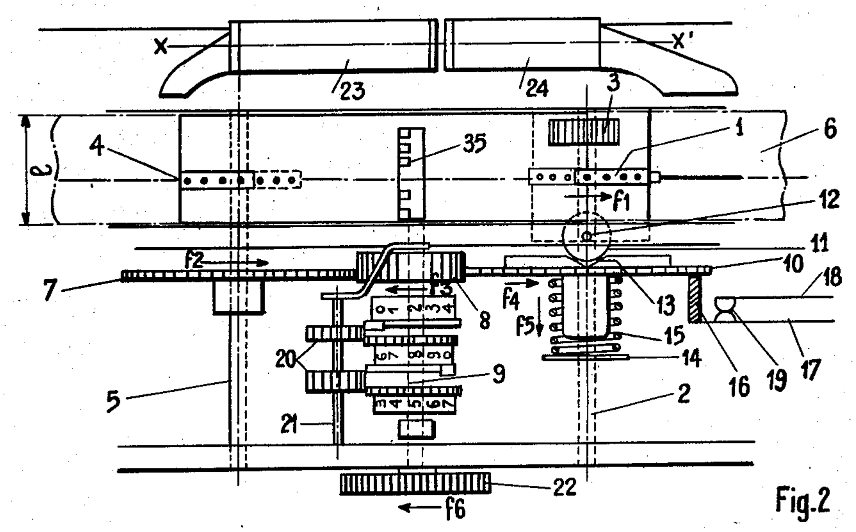
Figure 3:
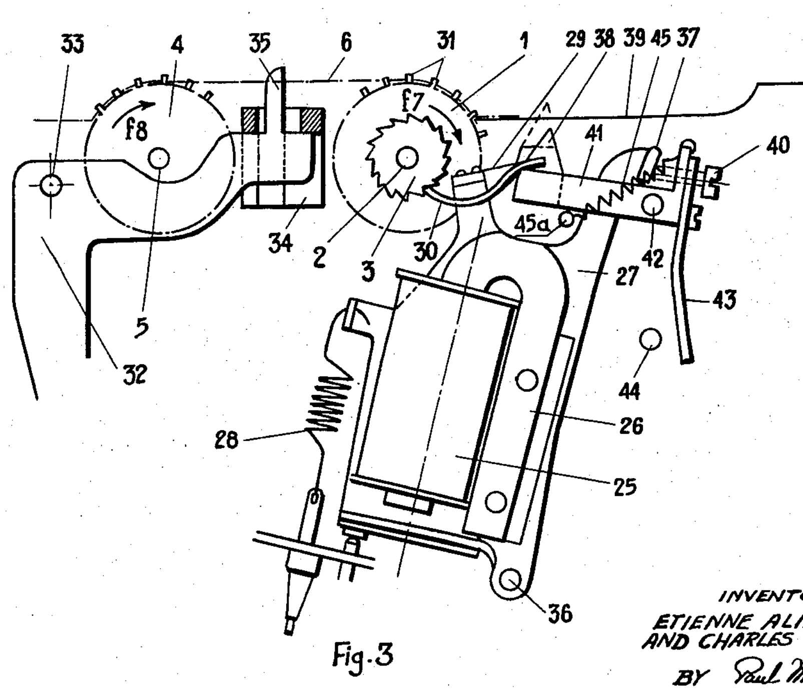
Figure 4:
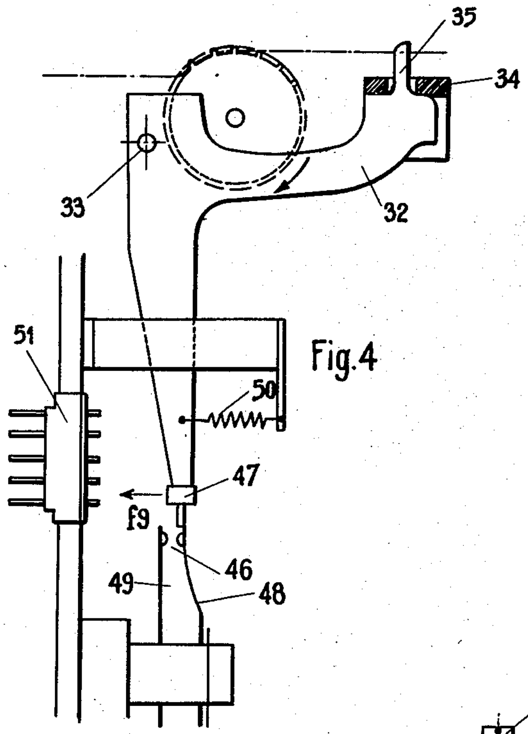
Figure 5:
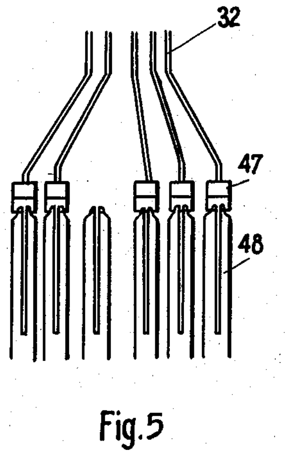
Figure 6:
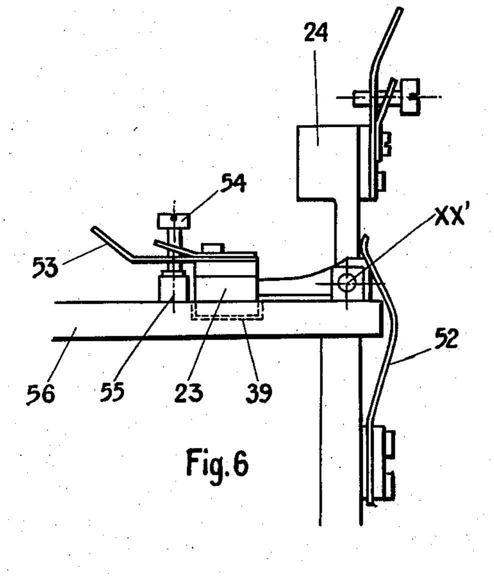
Figure 7:
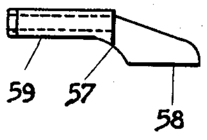
Figure 8:
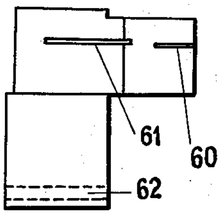
Figure 9:
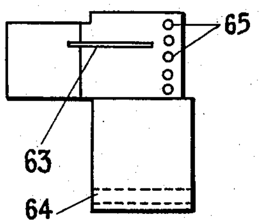
Figure 10:
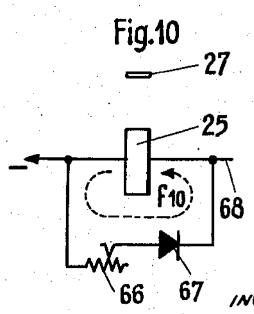

Figure 1 shows on an enlarged scale a portion of a perforated tape,

Figure 2 shows in plan view the device controlling the counter and controlling the contact for the interruption of the transmission, Figure 3 shows the device for actuating the driving wheel and the device for the control of the knife, Figures 4 and 5 show in elevation and in side view the control of the contact springs allocated to the five significant pulses, Figure 6 shows in side view the device for guiding the tape, Figures 7, 8 and 9 show details of tape-guiding flaps, and Figure 10 is a diagram of the electric speed-reducing device employed.

In the portion of the perforated tape illustrated in Figure 1, there will be seen regularly spaced holes "*a*" of small diameter, into which there can penetrate cylindrical teeth supported by wheels and serving solely to advance the paper tape, and other holes "*b*" of substantially larger diameter corresponding to the moments or significant pulses of the telegraphic signals. There correspond to each character transmitted five moments which are represented by perforations or imperforate portions, depending upon their polarity in the case of double-current evaluation, and depending upon whether or not there is current in the line in the case of single-current evaluation. Thus, in the illustrated tape portion width *l*, the first character to the left corresponds to the letter F if the first moment is at the top and the fifth moment at the bottom, the positive moments being represented by a hole, and the negative moments by an imperforate portion. The tape is fed forward step-by-step, each advance being effected during a fraction of the time corresponding to the transmission of the non-significant moments.

In Figure 2, the toothed driving wheel 1 keyed on the same shaft 2 as the ratchet wheel 3 controlled by a pawl and an electromagent (see also Figure 3) turns in the direction indicated by the arrow *f1*. The movement of the driving wheel is transmitted to a second toothed wheel 4 keyed on a shaft 5 by the perforated tape 6, the width *l* of which corresponds to the width of the tape considered with reference to Figure 1. The driven wheel 4 therefore turns in the same direction *f1* as the driving wheel 1. Also fixedly mounted on the shaft 5 of the driven wheel is a gear wheel 7, which is therefore also driven in a direction of rotation *f2* identical to the direction *f1*. The gear wheel 7 meshes with a toothed pinion 8 keyed on the shaft 9 of the counting wheels and drives it in the direction *f3*, which is opposite to the direction *f2*. The toothed pinion 8 also meshes with a second toothed wheel 10 mounted loose on the same shaft 2 as the driving wheel. The wheel 10 therefore turns in a direction *f4* which is the same as the direction *f1*, and since the wheels 7 and 10 have the same numer of teeth, the wheel 10 is therefore driven at the same angular velocity as the driving wheel 1. There is therefore no relative displacement between the wheel 1 and the wheel 10, which both advance by one circumferential step for points having the same radius at each pulse received by the controlling electromagnet. The driving wheel 1 supports a small roller 11 mounted loose on a shaft 12. The roller is situated at a distance from the shaft 2 of the driving wheel and in rotating describes a circumference around the said shaft. The wheel 10 comprises a diametral V-shaped notch 13 and the roller 11 normally becomes lodged in the said notch. When the system is in movement and nothing abnormal happens, since the wheels 1 and 10 turn at the same angular velocity the roller 10, in rotating, remains constantly in its notch. A locking device 14 non-slideably mounted on the shaft 2 serves as a fixed abutment for a spring 15, which bears at the other end on the wheel 10 and maintains the latter constantly in contact with the roller 11. An insulating push member 16 moves into the immediate proximity of the wheel 10 without, however, touching it and is adapted to control a movable contact blade 17, the initial tension of which tends to apply it with some pressure against the fixed contact blade 18. Under normal conditions, with the system rotating, the contact 19 remains closed and the counter advances by one step at each character transmission. In the event of breakage of the paper or tearing between a number of consecutive holes *"a,"* between the driving wheel 1 and the driven wheel 4, the latter stops by reason of the breakage, the counter ceases to rotate and the wheel 10 likewise stops. On the other hand, the driving wheel 1, on receiving the following feed pulse, causes the loose wheel 10 to move axially in the direction of the arrow *f5* under the action of the cam effect produced by the roller leaving the notch in the rotational movement. The loose wheel slides on the shaft 2 and compresses the spring 15 against the fixed abutment 14. The insulating push member 16 is therefore also pushed in the same direction as the arrow *f5* and the contact 19 opens and stops the transmission. The opening of contact 19 may stop transmission by interrupting the feeding circuit of controlling coil 25 which actuates the driving wheel 1. The counting of the pulses transmitted is effected in an entirely mechanical manner by the numeral wheels mounted on the shaft 9 and the tens and hundreds wheels are driven by auxiliary pinions 20 mounted on the shaft 21. A knurled button 22 rotated in the direction of the arrow *f6* permits re-setting of the counter. Two flaps 23 and 24, shown in raised positions and described in detail hereinafter in connection with Figures 6 through 9, are arranged to rotate about the axis XX′ and to bear against the perforated paper tape, which they maintain in predetermined position and the guiding of which can be adjusted thereby.

The controlling electromagent of Figure 3 is composed of a coil 25 mounted on a fixed magnetic circuit 26. A pawl 30 is secured by a flat spring 29 to the movable armature 27, which is returned into the inoperative position by a return spring 28, the said pawl stepping the ratchet wheel forward by one step each time that the armature 27 returns into the inoperative position after having been attracted by the electromagnet. The ratchet wheel drives the shaft 2, on which there is also keyed the toothed wheel 1, of which the teeth 31 engage in the holes *"a"* of Figure 1. The wheel 4 thus turns in the same direction as the wheel 1, as indicated by the arrows *f7* and *f8*. Five levers 32 (corresponding to the five moments) pivotally connected to a pin 33 abut a member 34, which also forms a lateral guide, and are each terminated by a tapered portion 35 adapted to penetrate, when necessary, into the perforations *"b"* in the paper tape. At the time when the armature pivoted at 36 effects the advance of the paper by means of its pawl, it also actuates by means of its bent-over portion 37 a knife 38 which is so adjusted as not to extend beyond the plate 39 on which the perforated tape slides, either in its inoperative position or in its established operative position. When the armature is suddenly attracted by the energization of the electromagnet, it imparts an impact at 37 to the end of an adjustable screw 40 fixed on a lever 41 and causes this lever 41 to turn about its axis of rotation 42 under the effect of the sharp impact received until the stem 43 abuts 44. The screw 40 may be withdrawn to the right in lever 41 to reduce or eliminate the action of the armature on the lever 41. The knife 38, which is also fixed on the member 41, is withdrawn to a certain extent from the plate 39 during this electromagnet energizing impulse and is displaced by the impact to cut the paper situated between two consecutive holes *"a"* in the perforated tape. The return spring 45 returns the lever 41 into contact with **45*a* although the electromagnet is still in the operative position and has not yet been de-energized. The paper is therefore cut before it is stepped forward, which is necessary because its forward movement could be impeded by the simultaneous presence of the knife. When the armature returns into the inoperative position, the driving wheel 1** advances and produces the forward movement of the paper only at this instant.

The lever 32 of Figure 4 pivotally connected at 33 is assumed to have felt a perforation and is in the position indicated in the figure, that is to say, the contact 46 is open. If the paper tape presents an imperforate portion instead of a perforation, the point 35 is depressed and the lower end of the lever 32 on which the insulating push member 47 is mounted moves in the direction of the arrow *f9* and the pre-curved movable spring 48 makes contact with the fixed spring 49 in accordance with French Patent No. 1,105,483, applied for on April 7, 1954. The return spring 50 of the lever 32 is tensioned and this condition is maintained as long as the same character persists. If the following character presents a perforation, a return spring 50 returns this system to its initial position determined by the guide abutment 34. The connecting stems of the springs, such as 48 and 49 are connected by wires to the connecting stems of male jacks 51, to which further connection will be made by means of female jacks.

Figure 5 illustrates the splaying of the levers 32 for the control of the stacking of the five moments.

The flaps 23 and 24 of Figure 6 (which will be seen raised or retracted in Figure 1) are pivoted on a pin coaxial with XX'. In the operative position, the flap 23 tends to turn under the action of the spring 52 and to bear with some pressure against the plate 39, but the perforated tape must be able to slide freely between the flap 23 and the plate 39. It is therefore necessary to have an adjusting device permitting adequate clearance for the forward feed, but permitting no other parasitic movement of the perforated tape. Each flap comprises for this adjustment an operating member to which is secured an adjustment screw 54. An abutment 55 fixed to the frame 56 permits of readily effecting the precise adjustment giving the appropriate clearance between the plate 39 and the flap 23.

The perforated tape must also be guided on the entire useful part of the feed mechanism comprising the two wheels for the feed of the paper and the knife device. Figure 7 shows the profile for the application of the flap 23 to the tape. A rounded portion 57 follows the form of the portion of the cylinder of the driving wheel, a flat portion 58 is parallel to the region in which the cutting of the paper takes place and a flat portion 59 is also parallel to a portion of the region which is situated between the driving and driven wheels. There will be seen in Figure 8, which shows the same flap 23 in elevation in the raised position, a narrow slot 60 in which the point of the knife engages, and a slot 61, in which the teeth 31 of the driving wheel (see Figure 3) can engage. The flap turns about the pin coaxial with XX' by means of its pin receiving recessed portion 62. Figure 9 is a side elevational view of the flap 24 as seen in the raised position of Figure 6. There will be seen therein a slot 63 for receiving the teeth of the driven wheel, a recess 64 for the passage of the pin coaxial with XX' and small cylindrical apertures 65 corresponding to the distance to which the tapered portion 35 of the levers 32 extends beyond the paper tape (see Figure 3).

According to the invention, it is preferable to provide two guide flaps 23 and 24 rather than one, whereby it is possible by raising only the flap corresponding to the driving wheel to exert a pull on the paper tape when effecting, for example, a phase adjustment by turning the driven wheel without turning the driving wheel and without danger of producing a displacement between a signal in the tape and the corresponding number of the counter.

Figure 10 shows, in shunt with the winding 25 of the electromagnet, a variable resistance 66 in series with a rectifier 67. The self-induction current which is set up at the end of a normal pulse has, in accordance with Lenz's law, the same direction as the main current. It will, therefore, flow in the direction of the arrow *f*10. The strength of this current is adjusted by means of the rheostat 66, the rectifier 67 preventing short-circuiting of the winding when the electromagnet is normally fed with positive polarity through the wire 68. The self-induction flux can thus be prolonged by this known device and its action is exerted in the opposite direction to that of the return spring of the armature. The movement for the return to the inoperative position is therefore less abrupt and permits of avoiding defects in the feed of the paper.

The scanner is also provided with a perforated tape storage means which is not illustrated in the drawings, but which is situated to the left of the driven wheel in Figure 3.

It is obvious that various modifications may be made to the device hereinbefore described in regard to the general arrangement, the control and the form of the feeler levers, in the formation of banks of contacts, and in the type of electromagnet employed without departing from the scope of the invention.

We claim:

1. A device for scanning a perforated tape and for simultaneously controlling the displacement of said tape, particularly for use in telecommunications, comprising a tape-driving wheel and a tape-driven wheel, the driving wheel transmitting its movement through the perforated tape to the driven wheel, a freely rotatable control wheel mounted coaxially of the driving wheel, means connected to the driven wheel for transmitting its movement to the control wheel and turning the latter at the same direction and at the same angular velocity as the driving wheel, and means interconnecting said driving and control wheels and rotatable therewith about the axis of said last-mentioned wheels and being so constructed and arranged as to exert a force generally in the direction of said axis in response to a differential in rotating speed of the driving wheel and the control wheel, when the latter fails to be driven by the tape, for actuating an electric contact.

2. A device according to claim 1 including a shaft carrying said driving wheel and wherein said control wheel is freely rotatable on said shaft.

3. A device for scanning a perforated tape and for simultaneously controlling the displacement of said tape, particularly for use in telecommunications, comprising a tape-driving wheel and a tape-driven wheel, the driving wheel transmitting its movements through the perforated tape to the driven wheel, a freely rotatable control wheel mounted coaxially of the driving wheel, means connected to the driven wheel for transmitting its movement to the control wheel and turning the latter at the same direction and at the same angular velocity as the driving wheel, and means responsive to a differential in rotating speed of the driving wheel and the control wheel, when the latter fails to be driven by the tape, for actuating an electric contact, said control wheel being mounted for axial displacement and said differential speed responsive means comprising a member connecting said driving and control wheels for shifting the control wheel axially upon relative speed variation of the driving and control wheels.

4. A device for scanning a perforated tape and for simultaneously controlling the displacement of said tape, particularly for use in telecommunications, comprising a tape-driving wheel and a tape-driven wheel, the driving wheel transmitting its movement through the perforated tape to the driven wheel, a freely rotatable control wheel mounted coaxially of the driving wheel, means connected to the driven wheel for transmitting its movement to the control wheel and turning the latter at the same direction and at the same angular velocity as the driving wheel, means responsive to a differential in rotating speed of the driving wheel and the control wheel, when the latter fails to be driven by the tape, for actuating an electrical contact, said differential speed responsive means comprising at said driving and control wheels a roller located on one of said last-mentioned wheels at a distance from its rotational axis, the roller being mounted for free rotation on a radially oriented shaft, and a notch in the other of the wheels in which the roller is lodged, spring means biasing said wheels relative each other to maintain said roller in said notch, said notch forming a cam to axially displace one of said wheels upon a change in speed of the driving wheel relative the control wheel, and means responsive to said axial displacement for actuating said contact.

5. A device for scanning a perforated tape and for simultaneously controlling the displacement of said tape, particularly for use in telecommunications, comprising a tape-driving wheel and a tape-driven wheel, the driving wheel transmitting its movement through the perforated tape to the driven wheel, a freely rotatable control wheel mounted coaxially of the driving wheel, means connected to the driven wheel for transmitting its movement to the control wheel and turning the latter at the same direction and at the same angular velocity as the driving wheel, means responsive to a differential in rotating speed of the driving wheel and the control wheel, when the latter fails to be driven by the tape, for actuating an electric contact, a ratchet wheel for driving said driving wheel, a pawl engageable with said ratchet wheel and an electromagnet having an armature for actuating said pawl, a spring biasing said pawl in one direction, said pawl being withdrawn by said electromagnet upon energization thereof and returned in said first direction upon deenergization of said electromagnet to drive said ratchet wheel, a knife mounted for displacement to cut said tape, and spring means biasing said knife to a withdrawn position, said knife being actuated to a tape cutting position through an energizing impulse of the electromagnet and being returned to the withdrawn position by the spring means before the pawl has commenced its ratchet actuating movement.

6. A device according to claim 5 comprising means for actuating the knife by the electromagnet including an adjustable screw having one adjusted position in which the knife remains inactive during energization of the electromagnet.

7. A device for scanning a perforated tape and for simultaneously controlling the displacement of said tape, particularly for use in telecommunications, comprising a tape-driving wheel and a tape-driven wheel, the driving wheel transmitting its movement through the perforated tape to the driven wheel, a freely rotatable control wheel mounted coaxially of the driving wheel, means connected to the driven wheel for transmitting its movement to the control wheel and turning the latter at the same direction and at the same angular velocity as the driving wheel, means responsive to a differential in rotating speed of the driving wheel and control wheel, when the latter fails to be driven by the tape, for actuating an electric contact, a ratchet wheel for driving said driving wheel, a pawl engageable with said ratchet wheel and an electromagnet having an armature for actuating said pawl, a spring biasing said pawl in one direction, said pawl being withdrawn by said electromagnet upon energization thereof and returned in said first direction upon de-energization of said electromagnet to drive said ratchet wheel, means for connecting a direct current source to energize said electromagnet, and a circuit comprising a resistance and a rectifier in series shunting said electromagnet, said rectifier being so oriented to prevent current flow in said circuit when said electromagnet is energized by said source and providing a path for self-induced current in said electromagnet when said source is disconnected.

References Cited in the file of this patent

UNITED STATES PATENTS

| | | |
|---|---|---|
| 2,140,620 | Farmer | Dec. 20, 1938 |
| 2,276,991 | Long | Mar. 17, 1942 |
| 2,410,521 | Potts | Nov. 5, 1946 |
| 2,451,045 | Potts | Oct. 12, 1948 |
| 2,699,702 | Cuber | Jan. 18, 1955 |
| 2,782,902 | Sloane | Feb. 26, 1957 |